(12) United States Patent
Kulprathipanja et al.

(10) Patent No.: US 6,726,744 B2
(45) Date of Patent: Apr. 27, 2004

(54) MIXED MATRIX MEMBRANE FOR SEPARATION OF GASES

(75) Inventors: Santi Kulprathipanja, Inverness, IL (US); Jutima Charoenphol, Nakhonsawan (TH)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/278,111

(22) Filed: Oct. 22, 2002

(65) Prior Publication Data

US 2003/0089228 A1 May 15, 2003

Related U.S. Application Data

(60) Provisional application No. 60/337,300, filed on Nov. 5, 2001.

(51) Int. Cl.$^7$ ............................ B01D 53/22; B01D 69/12; B01D 71/70
(52) U.S. Cl. ....................... 95/45; 95/47; 95/51; 95/54; 96/4; 96/12
(58) Field of Search ............................. 95/45, 47, 51, 95/54; 96/4, 12–14

(56) References Cited

U.S. PATENT DOCUMENTS

| | | | |
|---|---|---|---|
| 3,457,170 A | 7/1969 | Havens | 210/23 |
| 3,556,305 A | 1/1971 | Shorr | 210/490 |
| 3,862,030 A | 1/1975 | Goldberg | 210/24 |
| 3,878,104 A | 4/1975 | Guerrero | 210/323 |
| 3,993,566 A | 11/1976 | Goldberg et al. | 210/433 M |
| 4,032,454 A | 6/1977 | Hoover et al. | 210/323 R |
| 4,243,701 A | 1/1981 | Riley et al. | 427/244 |
| 4,302,334 A | 11/1981 | Jakabhazy et al. | 210/500.2 |
| 4,341,605 A | 7/1982 | Solenberger et al. | 204/98 |
| 4,606,740 A | 8/1986 | Kulprathipanja | 55/16 |
| 5,011,637 A * | 4/1991 | Overman et al. | 264/41 |
| 5,069,794 A * | 12/1991 | Haag et al. | 210/650 |
| 5,104,425 A * | 4/1992 | Rao et al. | 95/47 |
| 5,127,925 A | 7/1992 | Kulprathipanja et al. | 55/16 |
| 5,294,401 A * | 3/1994 | Hagiwara | 422/48 |
| 5,445,669 A * | 8/1995 | Nakabayashi et al. | 96/5 |
| 5,507,860 A * | 4/1996 | Rao et al. | 96/12 |
| 5,753,011 A * | 5/1998 | Sircar et al. | 95/45 |
| 5,772,735 A * | 6/1998 | Sehgal et al. | 95/45 |
| 6,500,233 B1 * | 12/2002 | Miller et al. | 95/50 |
| 6,503,295 B1 * | 1/2003 | Koros et al. | 95/51 |
| 6,508,860 B1 * | 1/2003 | Kulkarni et al. | 95/51 |
| 2002/0053284 A1 * | 5/2002 | Koros et al. | 95/51 |
| 2002/0056369 A1 * | 5/2002 | Koros et al. | 95/51 |

OTHER PUBLICATIONS

Journal of Membrane Science 175 (2000) 285–288 by Tantekin–Ersolmaz et al.
Journal of Membrane Science 91 (1994) 77–86 by Süer et al.
Journal of Membrane Science 136 (1997) 111–120 by Sungpet et al.

* cited by examiner

*Primary Examiner*—Robert H. Spitzer
(74) *Attorney, Agent, or Firm*—John G. Tolomei; Frank S. Molinaro; Mark Goldberg

(57) ABSTRACT

An improved mixed matrix membrane for the separation of gases comprises polyethylene glycol, silicone rubber and activated carbon on a porous support. The membrane preferably also comprises a carbonate such as potassium carbonate. The gases which may be separated by the membrane include mixtures of oxygen and nitrogen and mixtures of carbon dioxide and nitrogen. Membranes of this design may be used in processing natural gas or other gases.

19 Claims, 3 Drawing Sheets

MIXED MATRIX MEMBRANE FOR SEPARATION OF GASES

CROSS-REFERENCE TO RELATED APPLICATION

This application claims priority from Provisional Application Serial No. 60/337,300 filed Nov. 5, 2001, the contents of which are hereby incorporated by reference.

BACKGROUND OF THE INVENTION

It is often necessary or desirable to separate gases such as oxygen and nitrogen from each other or from other gas mixtures. The utility of this can range from a need to remove oxygen from a stream of combustible gases, to remove nitrogen to increase the oxygen content of medical oxygen, to perform a separation in a petrochemical process or as part of a process for the production of pure gas streams.

Several techniques including absorption into a solvent phase, pressure swing adsorption (PSA) and membrane separation have been developed for the purpose of performing these separations. Membrane separations are based upon the relative permeability of one gas molecule being much higher than that of another gas molecule through an otherwise impermeable membrane. Polymeric membranes have attracted a great deal of interest for use in gas separation. For example, some membranes which are used would include silicone membranes for oxygen/nitrogen separation, cellulose acetate membranes for carbon dioxide removal from natural gas and silicone-coated polysulfone membranes for hydrogen recovery from various waste streams. In a typical operation, a pressure differential is maintained across the polymeric membrane and provides the driving force for the permeation. Two properties of the membrane are of critical importance in determining the performance characteristic, which is possessed by the membrane. The first property is the solubility of the gas in the membrane, while the second property is the diffusivity of the gas in the membrane material. The product of these two properties, that is, solubility and diffusivity, is called the permeability. The higher the membrane permeability, the more attractive is the use of membranes for a gas separation process. As will hereinafter be shown in greater detail, the permeability of a polymeric membrane may be increased as well as altered by forming a mixed matrix membrane and thus providing a novel membrane of this invention.

With respect to some of the gas separation membranes heretofore known, it is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

There are various references which disclose the incorporation of various materials within separation membranes. U.S. Pat. No. 3,457,170 to Havens; U.S. Pat. No. 3,878,104 to Guerrero; U.S. Pat. No. 3,993,566 to Goldberg et al; U.S. Pat. No. 4,032,454 to Hoover et al; and U.S. Pat. No. 4,341,605 to Solenberger et al teach the use of structural supports or reinforcement fibers or fabrics to aid the membrane in resisting the high pressures used in the reverse osmosis process. U.S. Pat. No. 3,556,305 to Shorr shows a "sandwich" type reverse osmosis membrane comprising a porous substrate covered by a barrier layer, in turn covered by a polymer or film bonded to the barrier layer by an adhesive polymeric layer. U.S. Pat. No. 3,862,030 to Goldberg shows a polymeric matrix having an inorganic filler such as silica dispersed throughout which imparts a network of micro-voids or pores of about 0.01 to about 100 microns, capable of filtering microscopic or ultrafine particles of submicron size. U.S. Pat. No. 4,302,334 to Jakabhazy et al discloses a membrane "alloy" comprising a hydrophobic fluorocarbon polymer blended with polyvinyl alcohol polymer which imparts hydrophilic properties to the membrane.

U.S. Pat. No. 4,606,740 describes the composition and manufacture of multi-component membranes containing polyethylene glycol useful in the separation of gas mixtures. This reference also discloses the use of polysulfone supports. U.S. Pat. No. 5,127,925 describes the separation of gases by use of a mixed matrix membrane consisting of polysilicone having a solid particulate adsorbent incorporated therein.

We have now discovered a novel and highly advantageous method of preparing a mixed matrix membrane. We have also discovered that the mixed matrix membrane, when prepared according to the process of the present invention, is unique in its character inasmuch as the steady state permeability of the membrane has been altered in such a manner so as to permit a desired selectivity with respect to the passage of a predetermined fluid, and particularly a gas, from a mixture of fluids or gases through the mixed matrix membrane. We have further developed a specific combination of ingredients making up a mixed matrix membrane which heretofore has not been known prior to our invention.

SUMMARY OF THE INVENTION

The subject invention is a mixed matrix membrane having improved stability and separation performance. The invention also encompasses a method of manufacturing the improved membrane. These improvements result from the inclusion of activated carbon or a similar acting substance into a formulation containing polyethylene glycol.

DETAILED DESCRIPTION AND PREFERRED EMBODIMENTS

The subject invention relates to the composition of a multi-component or mixed matrix membrane having improved selectivity for the separation of gases especially for the separation of oxygen and nitrogen. Such membranes find utility in a variety of industrial and consumer applications as described below. The utility of any particular membrane is closely tied to performance factors such as selectivity and permeability. The ability of a membrane to separate gaseous materials is controlled by solubility (S) and diffusivity (D). The permeability (P) equals S times D. The selectivity of components 1 and 2 is defined by the following equation:

$$\frac{P_1}{P_2} = \frac{S_1}{S_2} \times \frac{D_1}{D_2}$$

Some of the normally gaseous materials which can be separated using these membranes are shown in the following table together with the kinetic diameter of the gas molecules, a factor which relates to their ability to enter the solid component of the mixed matrix membrane. The solid component, which may be a zeolite or other adsorptive material, is not used as an adsorbent in the membrane, but instead functions to increase the solubility of a desired permeate gas molecule in the composite membrane. This increases the ratio $S_1$: $S_2$ of the selectivity definition.

TABLE 1

| Molecule | Molecular Diameter Å |
|---|---|
| $NH_3$ | 2.6 |
| $H_2O$ | 2.65 |
| $H_2$ | 2.89 |
| $C_2H_2$ | 3.3 |
| $O_2$ | 3.46 |
| $SO_2$ | 3.6 |
| $N_2$ | 3.64 |
| CO | 3.76 |
| $CH_4$ | 3.8 |
| $C_2H_4$ | 3.9 |

Figure 1:
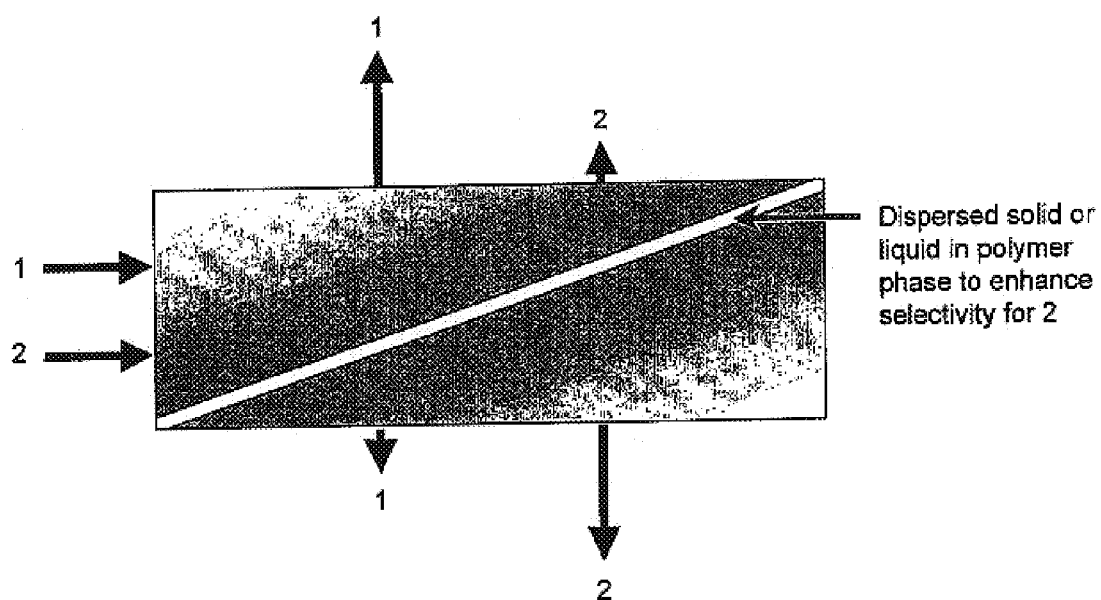
FIG. 1 is a schematic of a mixed matrix membrane separation of two gases.

FIG. 1 is a representation of a membrane separation of components 1 and 2. It illustrates feeding a gas mixture containing equal amounts of components 1 and 2 to the left hand side of the apparatus with component 2 preferentially passing through the membrane such that the product gas exiting the bottom of the apparatus is enriched in gas component 2. In this instance, component 2 is the desired permeate molecule. A minor part of component 1 is shown passing through the membrane with component 2, with the majority of component 1 not passing through the membrane. The dispersed solid or liquid in the polymer phase, which is the origin of the term "mixed-matrix membrane", increases the selectivity for component 2. Since the solid is not intended to act as adsorbent, its selectivity for the desired permeate need not be very strong. While it should be selective for the desired permeate, a strong selectivity as an adsorbent results in little contribution by the solid to the mixed matrix membrane.

In prior art mixed matrix membranes, there have been shown two different types of mixed membranes—those containing a solid in the polymer and those containing a liquid in the polymer. In one prior art membrane a solid containing membrane contains silicalite dispersed in cellulose acetate. An example of a liquid-polymer mixed matrix membrane is polyethylene glycol dispersed in silicone rubber. These prior art mixed matrix membranes are also described in the previously cited U.S. Pat. No. 4,606,740 and in many literature papers such as those cited as *Journal of Membrane Science* 175 (2000) 285–288 by Tantekin-Ersolmaz et al.; *Journal of Membrane Science* 91 (1994) 77–86 by Süer et al.; and *Journal of Membrane Science* 136 (1997) 111–120 by Sungpet et al. The teaching of these references as to the composition and production of mixed matrix membranes for gas separation is expressly incorporated herein.

Figure 2:
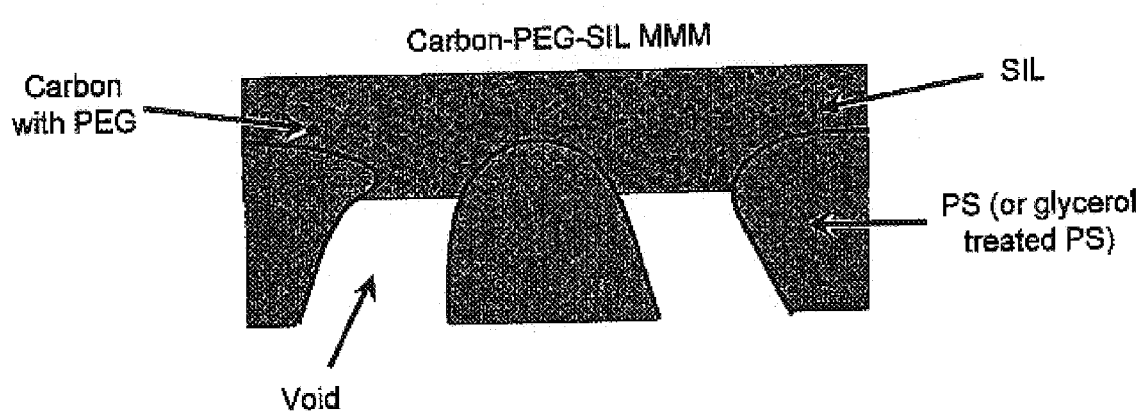
FIG. 2 shows a schematic of a solid/liquid/polymer membrane of the present invention.

FIG. 2 is a simplified diagram intended to pictorially represent the overall structure and composition of the solid-liquid-polymer membranes of the present invention that provide unexpected advantages in separation of gases over prior art membranes. This membrane is therefore a blend of the solid polymer and the liquid polymer mixed matrix membrane. FIG. 2 shows a layer of a membrane media, in this instance comprising polyethylene glycol (PEG) and solid particles dispersed in the silicone rubber. This layer rests upon the polysulfone fabric that provides strength and form to the membrane. The polysulfone fabric has numerous small openings through it represented by the voids. The membrane media bridges these voids to present a solid layer which resists gas flow.

The membrane of the subject invention contains a plasticizer that is preferably a glycol plasticizer having a molecular weight of from about 200 to 600. Preferably, this plasticizer is polyethylene glycol (PEG). Other glycol plasticizers that are suitable include tetraethylene glycol, propylene glycol and polypropylene glycol.

The membrane also contains a silicone rubber (SIL). The silicone rubber can be described as forming an emulsion with the glycol plasticizer, with the PEG being dispersed in the silicone rubber.

The membrane contains from about 5 to 50% plasticizer and from about 40 to 85% silicone rubber. A preferred range of plasticizer content is from about 10 to 30%. A preferred range of silicone rubber content is from about 60 to 80%. All percentages referred to herein are weight percent unless otherwise specified.

The membranes of the present invention also contain an adsorbent component exemplified by activated carbon. This component is present as undissolved very small size particles dispersed throughout the cast portion of the membrane. The membrane should contain about 1 to 40% activated carbon or equivalent adsorbent. A preferred range of carbon content is 5 to 25%. It is preferred that the activated carbon has a particle size between 0.1 and 5 microns, with a broad particle size distribution ranging from 0.1 to 200 microns. Activated carbon sold commercially by Calgon Carbon Corporation under the product designation CAL was used in the formulations reported herein. Other types of adsorbent components may be used such as zeolites and carbonate salts.

The activated carbon is believed to function as a substrate or support for the PEG. Hence the PEG is thought of as being adsorbed on the surface of the carbon particles. Other materials including inorganic oxides can also function effectively in this manner to stabilize the PEG or other plasticizer. For instance, finely ground alumina, silica or zeolites could function in this manner. As shown by the test results presented below, the presence of activated carbon in the silicone rubber—PEG membrane improves selectivity for gas separations. The carbon may also improve stability. Stability of the membrane is tested by separating nitrogen and then carbon dioxide, with the chosen permeate changed every 24 hours. The stability test is performed at 70° C. at a pressure across the membrane varying between 172 and 345 kPa (25 and 50 psig).

The membrane may also contain a carbonate, with both inorganic and organic carbonates suitable for inclusion. Examples of suitable carbonates include sodium and potassium carbonates. The presence of a carbonate is beneficial when it is desired to separate carbon dioxide from a feed gas mixture such as a gas containing nitrogen, oxygen or light hydrocarbons e.g. methane. In this situation it is important that the feed gas stream contains water although the relative humidity of the feed over a range of 30 to 70% relative humidity has been found to not significantly change selectivity of the membrane for the separation of carbon dioxide from nitrogen. The feed gas stream may be saturated with water.

One embodiment of the membrane compositions of the present invention comprises 5% potassium carbonate, 15% activated carbon and 80% silicone rubber.

A second embodiment of the membrane compositions of the present invention comprises 20% activated carbon, 10% PEG and 70% silicone rubber.

A third embodiment of the membrane compositions of the present invention comprises 5% potassium carbonate, 15% activated carbon, 10% PEG and 70% silicone rubber.

The membrane may be formed by mixing (stirring or shaking) the required ingredients in the presence of a suitable solvent at room temperature and then casting the membrane by spreading the liquid-phase mixed membrane media ingredients onto a porous support media by conventional methods. The membrane can also be dipped into or passed through a pool of the mixed ingredients. Excess membrane media is then removed and the remaining membrane media is allowed to cure as by exposure to an elevated temperature up to 100° C. A preferred support media is a woven or non-woven polymeric fabric which is resistant to the chemicals and temperatures to which the membrane will be exposed. Cellulose acetate, polysulfone, polyethersulfone and polyimides are such materials. Porous polysulfone is a preferred support media. The polysulfone may be treated by contact with a polyhedric alcohol such as ethylene glycol, catechol or propylene glycol. The preferred polyhedric alcohol is glycerol. Treating may be accomplished by exposure of the support media to the liquid polyhedric alcohol for 1 to 4 hours followed by air drying at room temperature.

Figure 3:
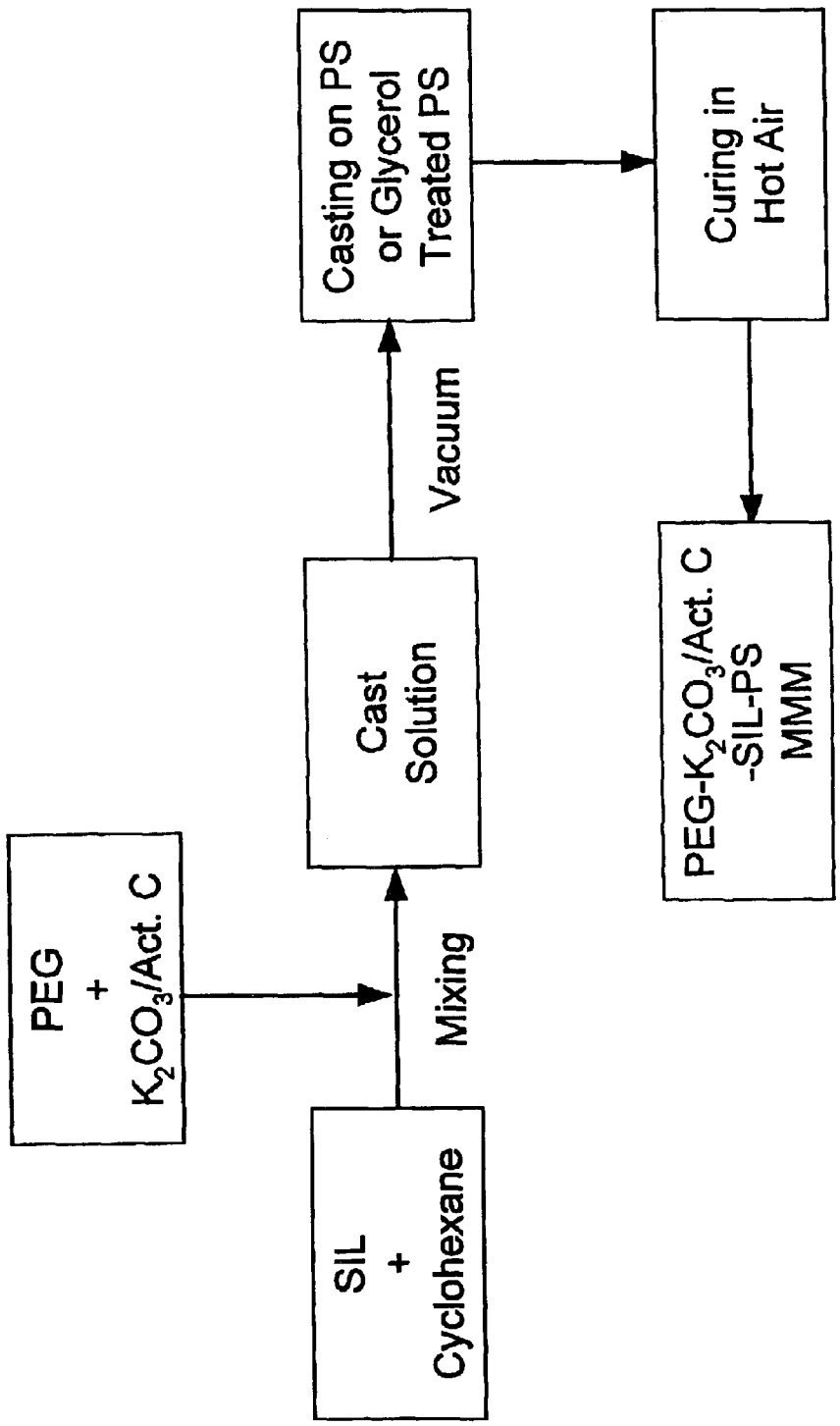
FIG. 3 is a flow chart of the preparation of the mixed matrix membranes of the present invention.

FIG. 3 illustrates the steps in producing a membrane comprising PEG, potassium carbonate, activated carbon and silicone rubber. It shows the two initial mixing steps which form separate mixtures. The silicone rubber is mixed with cyclohexane solvent and a separate mixture of PEG combined with potassium carbonate and activated carbon is made. These two mixtures are then mixed together to form a cast solution which is then cast upon a support media such as the treated porous polysulfone. The cast solution after being cast is then cured in hot air.

In preferred embodiments of the invention, the carbon is added to the silicon rubber prior to adding the plasticizer. Such adding is in the presence of a suitable solvent. Fluorinated hydrocarbons such as trifluorotrichloroethane have been used as solvents, but due to environmental concerns, a nonfluorinated hydrocarbon such as cyclohexane is preferred but is not environmentally acceptable by today's standards. The solvent is used in an amount which gives a workable mixture suitable for casting. A solvent content in the range of from 80 to 95% is normally suitable. The solvent is removed from the membrane during the curing step. U.S. Pat. No. 4,606,740 is incorporated herein for its teaching as to the method of manufacture of membranes. The resultant layer of membrane media is preferably about 30 mils thick (one mil equals 0.001 inch). The thickness of the layer can vary as desired.

The membrane of the subject invention can accordingly be characterized as a multi-component membrane for the separation of gases, the membrane comprising a mixture of a plasticizer which is preferably polyethylene glycol, silicone rubber and a particulate solid support for the plasticizer suspended in a uniform thickness layer on a porous support media. The solid support for the plasticizer may be chosen from the group consisting of alumina, silica, zeolites and activated carbon.

The gases that can be separated by the membranes of the present invention include oxygen and nitrogen. Light olefins can be separated from light paraffins using these membranes. The membranes can also be used to separate nitrogen from other gas mixtures including the separation of nitrogen or hydrogen from gaseous hydrocarbon mixtures containing methane, ethane and similar light hydrocarbons, as for example a natural gas stream. The membranes can be used in the production of relatively pure oxygen or nitrogen as may be useful in medical or industrial applications. They can be used in the preparation of the feed stream to a cryogenic gas separation process producing nitrogen and/or oxygen or in combination with a pressure swing adsorption (PSA) unit. The membrane can be used to prepare the feed to the PSA unit or to process an effluent of a PSA unit as to produce a recycle stream.

Membranes prepared in accordance with the present invention can also be useful in the separation of polar and non-polar gases. Therefore, such membranes are useful in separating gas mixtures containing hydrogen sulfide, carbon dioxide, carbon monoxide, sulfur dioxide, ammonia, hydrogen and others. The membrane then finds utility in removing pollutants or other compounds from combustion products such as flue gas streams.

The membrane used in the tests described below were produced by admixing 16% silicone rubber, 79% cyclohexane solvent and 5% PEG. A membrane of the subject invention was made by admixing approximately 17% silicone rubber, 78% cyclohexane and 5% activated carbon. A second membrane of the subject invention was formulated from a mixture of approximately 47% silicone rubber, 41% cyclohexane, 9% activated carbon and 3% potassium carbonate. Another membrane of the invention was produced from a mixture 17% silicone rubber, 76% cyclohexane, 2% PEG and 5% activated carbon. Another membrane of the invention was produced from a membrane media mixture containing approximately 17% silicone rubber, 76% cyclohexane, 2% PEG, 4% activated carbon and 1% potassium carbonate.

Table 2 presents test data derived from using three different membranes of the indicated composition to separate carbon dioxide and nitrogen. The numbers in parenthesis are derived by calculation from the cited U.S. Pat. No. 4,606,740. This data is presented for comparison purposes only. It does, however, illustrate the beneficial presence of PEG.

TABLE 2

| Membrane | $P_{CO_2}/P_{N_2}$ | $P_{CO_2}/d*10^6$ cm$^3$ (STP)/cm$^2$-sec-cm(Hg) |
|---|---|---|
| SIL-PS | 11 (11.4) | 14.3 (61) |
| PEG/SIL MMM | 42 (67) | 4.89 (13.6) |
| PEG/SIL Gly-P MMM | 61 (100) | 5.45 (13.2) |

SIL-PS = Silicone rubber coated on porous polysulfone
PEG/SIL MMM = Polyethylene glycol/silicone rubber coated on porous polysulfone
PEG/SIL/Gly-P MMM = Polyethylene glycol/silicone rubber coated on glycerol treated porous polysulfone Table 3 presents data from additional tests, with these test results showing the benefit derived from adding activated carbon to the formulations. The second and fourth membranes are equivalent to the first and third but have activated carbon added. The fourth membrane in the following table illustrates the excellent properties exhibited by the present invention. Selectivity and permeability both increase due to the addition of carbon and the improvement was even better with the addition of both PEG and activated carbon.

TABLE 3

| Membrane | $P_{CO_2}/P_N$ | $P_{CO_2}/d*10^6$ cm$^3$ (STP)/cm$^2$-sec-cm(Hg) |
|---|---|---|
| SIL-PS | 11 | 14.3 |
| Act.C/SIL MMM | 15 | 29.4 |
| PEG/SIL MMM | 42 | 4.9 |
| PEG/Act.C/SIL MMM | 47 | 24.2 |

Act.C/SIL MMM = Activated Carbon/Silicone rubber coated on porous polysulfone
PEG/Act.C/SIL MMM = Polyethylene glycol/Activated Carbon/silicone rubber coated on porous polysulfone Table 4 presents data from additional tests measuring the separation properties of membranes with potassium carbonate as an added component in the last membrane tested. Again, the second and forth membranes compositions are the same as the first and third except that the additional membrane component is present.

TABLE 4

| Membrane | $P_{CO_2}/PN$ | $P_{CO_2}/d*10^6$ cm$^3$ (STP)/cm$^2$-sec-cm(Hg) |
|---|---|---|
| Act.C/SIL MMM | 15 | 29.4 |
| K$_2$CO$_3$/Act.C/SIL MMM | 20.1 | 16.2 |
| PEG/Act.C/SIL MMM | 34.6 | 26.2 |
| PEG/K$_2$CO$_3$/Act.C/SIL MMM | 40.5 | 14.3 |

K$_2$CO$_3$/Act.C/SIL MMM = K$_2$CO$_3$/Activated Carbon/silicone rubber coated on porous polysulfone
PEG/K$_2$CO$_3$/Act.C/SIL MMM = Polyethylene glycol/K$_2$CO$_3$/Activated Carbon/silicone rubber coated on porous polysulfone All test data presented herein is at 20° C. unless otherwise indicated.

The membranes must be used at appropriate separation promoting conditions. The preferred embodiments of the subject membrane have been tested at separation promoting conditions ranging in temperatures ranging from 20° to 100° C. A positive pressure gradient across the membrane is needed to drive the passage of the gases through the membrane. A pressure differential above 172 kPa (25 psig) is preferred. The pressure differential across the membrane is limited by the strength of the membrane. This contrasts with the absolute operating pressure of the membrane which is limited only by the strength of the equipment which encloses the membranes.

The membranes of the present invention can be used in place of prior art membranes in separation equipment of conventional design. The amount of permeate recovered is proportional to the area of membrane used and therefore equipment designs which provide large surface areas such as spiral wound tube bundles or bundles containing a large number of small diameter (hollow fiber) tubes are preferred.

EXAMPLE 1

The following steps prepared a mixed matrix membrane of the present invention: Part 1: A silicone rubber solution was prepared by mixing 1.08 grams of GE Silicones RTV-615A and 0.12 grams of GE Silicones RTV-615B in 10 grams of cyclohexane. Part 2: A polyethylene glycol (PEG) impregnated activated carbon was prepared by adding 0.12 grams of 400 MW PEG in 0.24 grams of activated carbon (0.1–5 microns in particle size sold by Calgon Carbon Co). A casting solution was prepare by mixing PEG impregnated activated carbon from part 2 above into the silicone rubber solution in part 1 above. The casting solution was degassed using vacuum pump. The degassed solution was poured over a porous polysulfone (PS). After the coating, the membrane was cured for a period of 60 minutes at a temperature of 82° C. This membrane was labeled "A". This membrane was composed of PEG/Activated carbon/Sil/PS.

EXAMPLE 2

To illustrate the advantages with respect to the separation factors and permeability which are enjoyed when utilizing a mixed matrix membrane of the present invention (from example 1) in contrast with other multi-component membranes, three multi-component membranes were prepared. These membranes are as follows:

Membrane "B"—Sil/PS, This membrane was prepared according to example 1 above but without PEB impregnated activated carbon.

Membrane "C"—Activated carbon/Sil/PS, This membrane was prepared according to Example 2 above with the addition of 0.24 grams of activated carbon (0.1 to 5 microns in particle size sold by Calgon Carbon Co.).

Membrane "D"—A PEG/Sil/PS, This membrane was prepared according to example 2 above with the addition of 0.12 grams of 400 MW PEG.

EXAMPLE 3

The membranes "A", "B", "C" and "D" which were prepared according to Examples 1 and 2 above were then tested by utilizing a sample of each membrane having a diameter of 7.5 cm. Placed in a test apparatus. The gases to be tested, in this invention were carbon dioxide and nitrogen were passed through the membrane under pressures from 345 to 517 kPa (50 to 75 psi) at ambient temperature. The flux and selectivity for carbon dioxide and nitrogen were measured and calculated. The results of this test are set forth in Table 5 below.

TABLE 5

| Membrane | $P_{CO_2}/P_{N_2}$ | $P_{CO_2}/d*10^6$ cm$^3$ (STP)/cm$^2$-sec-cm(Hg) |
|---|---|---|
| "A"-PEG/Activated carbon/Sil/PS | 34.6 | 26.2 |
| "B"-Sil/PS | 11 | 14.3 |
| "C"-Activated carbon/Sil/PS | 15 | 29.4 |
| "D"-PEG/Sil/PS | 34.9 | 8.1 |

What is claimed is:

1. A multi-component membrane for the separation of gases, the membrane comprising a mixture of a plasticizer, silicone rubber and a particulate solid support for the plasticizer on a porous support media.

2. The membrane of claim 1 wherein the solid support for the plasticizer is chosen from the group consisting of alumina, silica, zeolites and activated carbon.

3. The membrane of claim 1 wherein the solid support for the plasticizer is activated carbon.

4. The membrane of claim 3 wherein said plasticizer is selected from the group consisting of polyethylene glycol, tetraethylene glycol, propylene glycol and polypropylene glycol.

5. The membrane of claim 4 wherein said plasticizer is polyethylene glycol.

6. The membrane of claim 1 wherein the membrane further comprises a carbonate selected from the group consisting of at least one inorganic carbonate, organic carbonate and mixtures thereof.

7. The membrane of claim 6 wherein said carbonate comprises potassium carbonate or sodium carbonate.

8. A multi-component membrane for the separation of gases, wherein said membrane comprises a mixture of polyethylene glycol, silicone rubber and activated carbon on a porous support media.

9. The membrane of claim 8 wherein said membrane further comprises potassium carbonate.

10. A process for separating a gas mixture comprising contacting a pressurized gas mixture with the membrane of claim 8 at separation promoting conditions.

11. The process of claim 10 wherein said gas mixture comprises at least two gases from the group consisting of nitrogen carbon dioxide, sulfur dioxide, ammonia, hydrogen sulfide, hydrogen and oxygen.

12. A method of manufacturing a membrane which comprises the steps of mixing polyethylene glycol with a carbonate containing adsorbent particles to form a first mixture, mixing silicone rubber with a solvent to form a second mixture, blending the first and second mixtures to a third mixture, casting the third mixture onto a porous support and drying and curing the membrane.

13. The method of claim 12, wherein said adsorbent particles are selected from the group consisting of activated carbon particles, zeolites, alumina, inorganic oxides and silica.

14. The method of claim 13 wherein said adsorbent particles are activated carbon particles.

15. The method of claim 14 wherein said is about 1 to 40 percent by weight of said activated carbon particles.

16. The method of claim 12 wherein the solvent is cyclohexane.

17. The method of claim 12 wherein said carbonate is selected from the group consisting of organic and inorganic carbonates.

18. The method of claim 12 wherein said carbonate is sodium carbonate or potassium carbonate.

19. The method of claim 12 wherein said porous support comprises polysulfone, polyethersulfone, polyimide or cellulose acetate.

* * * * *